US010652648B2

(12) United States Patent
Masui

(10) Patent No.: US 10,652,648 B2
(45) Date of Patent: May 12, 2020

(54) SOUND OUTPUT DEVICE AND CONTROL METHOD FOR SOUND OUTPUT DEVICE

(71) Applicant: YAMAHA CORPORATION, Hamamatsu-shi (JP)

(72) Inventor: Hideyoshi Masui, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/359,081

(22) Filed: Mar. 20, 2019

(65) Prior Publication Data

US 2019/0297410 A1     Sep. 26, 2019

(30) Foreign Application Priority Data

Mar. 23, 2018   (JP) ................. 2018-055907

(51) Int. Cl.
*H04R 29/00* (2006.01)
*H04R 1/10* (2006.01)
*G06F 3/16* (2006.01)
*G10K 11/178* (2006.01)

(52) U.S. Cl.
CPC ........... *H04R 1/1083* (2013.01); *G06F 3/165* (2013.01); *G10K 11/1783* (2018.01); *G10K 11/17873* (2018.01); *G10K 11/17875* (2018.01); *H04R 29/00* (2013.01); *G10K 2210/1081* (2013.01); *G10K 2210/3014* (2013.01); *G10K 2210/3056* (2013.01)

(58) Field of Classification Search
CPC .................................... H04R 29/00
See application file for complete search history.

(56) References Cited

U.S. PATENT DOCUMENTS

| 8,798,283 B2 * | 8/2014 | Gauger, Jr. ............ H04R 3/002 381/71.6 |
| 2014/0126734 A1 | 5/2014 | Gauger, Jr. et al. |
| 2016/0240185 A1 | 8/2016 | Park |

FOREIGN PATENT DOCUMENTS

| EP | 2131354 A2 | 12/2009 |
| GB | 2479672 A | 10/2011 |
| JP | 2015537465 A | 12/2015 |

OTHER PUBLICATIONS

Extended European Search Report issued in European Appln. No. 19164116.6 dated Jul. 12, 2019.

* cited by examiner

*Primary Examiner* — Olisa Anwah
(74) *Attorney, Agent, or Firm* — Rossi, Kimms & McDowell LLP

(57) ABSTRACT

A sound output device includes: a first microphone configured to receive ambient sounds from around a user; a loudspeaker configured to output sounds toward an eardrum of the user; signal processing circuitry configured, in a case in which it is detected that an external terminal is in a playback state in which the external terminal provides a playback sound signal indicative of a playback sound, to generate a first reverse-phase signal based on a first signal derived from a sound received by the first microphone, and configured to impart predetermined frequency characteristics to the first signal in a case in which it is detected that the external terminal is in a stopped state that is not the playback state; and an adder configured to add together the playback sound signal and a signal output from the signal processing circuitry, to output a resultant signal for output by the loudspeaker.

7 Claims, 12 Drawing Sheets

STOP → PLAYBACK

PLAYBACK → STOP

SOUND OUTPUT DEVICE AND CONTROL METHOD FOR SOUND OUTPUT DEVICE

CROSS REFERENCE TO RELATED APPLICATIONS

This application is based on, and claims priority from, Japanese Patent Application No. 2018-055907, filed Mar. 23, 2018, the entire content of which is incorporated herein by reference.

BACKGROUND

Technical Field

The present invention relates to sound output devices and to control methods therefor.

Description of Related Art

It is desired that sound output devices, such as earphones and headphones, be equipped with listen-through capability. Listen-through capability enables a user wearing a sound output device to hear ambient sounds as if the user were not wearing the sound output device (see Japanese Translation of PCT International Application Publication No. JP-T-2015-537465, for example).

In a case in which the user is wearing a sound output device to listen to sounds that are to be played back (hereafter, "playback sounds") provided from an external terminal, such as a music player, together with ambient sounds, it is sometimes difficult for the user to perceive the playback sounds.

SUMMARY

The present invention was made in view of the above circumstances, and it has as an object to provide a technique by which difficulties in perceiving playback sounds are reduced, where the difficulties arise when playback sounds and ambient sounds both reach the user's ears while the user is wearing a sound output device.

The present invention also has as an object to provide a technique by which a user is able to perceive ambient sounds naturally in a case in which no playback sound is provided.

To achieve the above objects, a sound output device according to an aspect of the present invention includes: a first microphone configured to receive ambient sounds from around a user; a loudspeaker configured to output sounds toward an eardrum of the user; signal processing circuitry configured, in a case in which it is detected that an external terminal is in a playback state in which the external terminal provides a playback sound signal indicative of a playback sound, to generate a first reverse-phase signal based on a first signal derived from a sound received by the first microphone, and configured to impart predetermined frequency characteristics to the first signal in a case in which it is detected that the external terminal is in a stopped state that is not the playback state; and an adder configured to add together the playback sound signal and a signal output from the signal processing circuitry, to output a resultant signal for output by the loudspeaker.

A method of controlling a sound output device according to another aspect of the present invention includes a first microphone that receives ambient sounds from around a user and a loudspeaker that outputs sounds toward an eardrum of the user; generating, in a case in which it is detected that an external terminal is in a playback state that provides a playback sound signal indicative of a playback sound, a first reverse-phase signal based on a first signal derived from a sound received by the first microphone; imparting predetermined frequency characteristics to the first signal in a case in which it is detected that the external terminal is in a stopped state that is not the playback state; and outputting to the loudspeaker a signal obtained by adding together the playback sound signal and a signal obtained by imparting the predetermined frequency characteristics to the first signal.

DESCRIPTION OF THE EMBODIMENTS

Description will be given below of embodiments, with reference to the accompanying drawings.

First Embodiment

Figure 1:
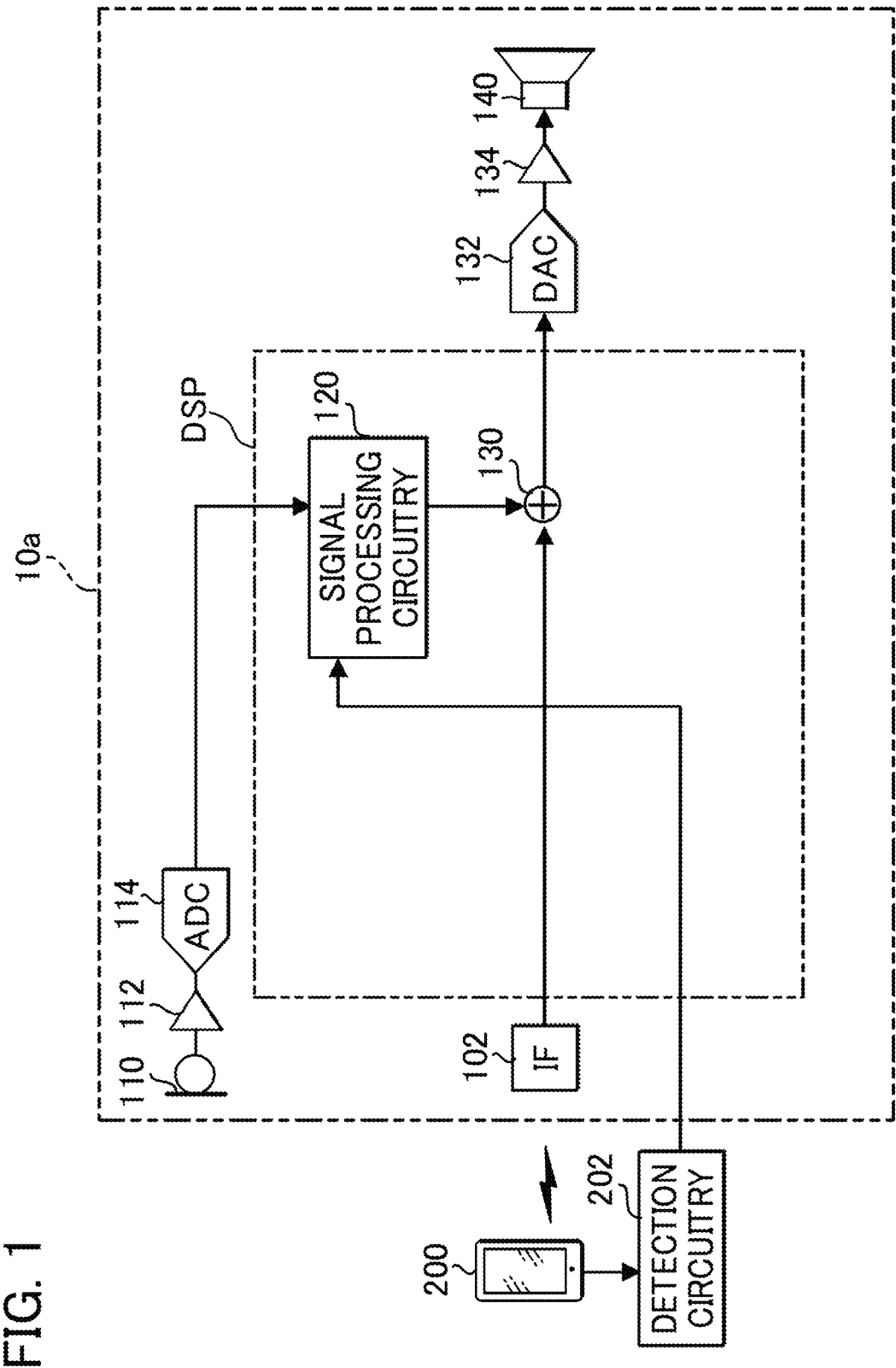
FIG. 1 is a block diagram showing a configuration of an earphone according to a first embodiment.

FIG. 1 is a block diagram illustrating a configuration of an earphone 10a, which is an example of a sound output device according to a first embodiment. As shown in FIG. 1, the earphone 10a includes an interface (IF) 102, a microphone 110, an amplifier 112, an amplifier 134, an ADC (analog-to-digital converter) 114, signal processing circuitry 120, an adder 130, a DAC (digital-to-analog converter) 132, and a loudspeaker 140. When the earphone 10a is worn by a user, the loudspeaker 140 is disposed such that sound is output toward an eardrum of the user.

The microphone 110 (first microphone) receives ambient sounds from around the user who is wearing the earphone 10a. The amplifier 112 amplifies a signal (first signal) derived from a sound received by the microphone 110. The ADC 114 converts the first signal amplified by the amplifier 112 into a digital signal and provides the converted first signal to the signal processing circuitry 120. Detection circuitry 202 detects whether an external terminal 200 is in a playback state or in a stopped state, in which the detection is performed based on a state signal communicated by the external terminal 200. The detection circuitry 202 provides a result of the detection to the signal processing circuitry 120. In a case in which the external terminal 200 is a personal computer (PC), for example, and is configured to play music by executing application programs, to thereby output a playback sound signal, the external terminal 200 and the detection circuitry 202 together form the PC.

The signal processing circuitry 120 performs on the first signal output from the ADC 114 processing depending on the state of the external terminal, and provides the processed signal to a first input terminal of the adder 130. More specifically, in a case in which the detection circuitry 202 detects that the external terminal 200 is in the playback state, the signal processing circuitry 120 generates reverse-phase signals (feed-forward reverse-phase signals) by adjusting the frequency, amplitude, and phase of the first signal output from the ADC 114. The reverse-phase signal corresponds to a signal obtained by inverting the phase of an ambient sound signal derived from an ambient sound that has entered through a vent (details described later) or the like. The volume (amplitude) of the reverse-phase signal is substantially equal to that of the ambient sound signal. In a case in which the detection circuitry 202 detects that the external terminal 200 is in the stopped state, the signal processing circuitry 120 performs, on the first signal output from the ADC 114, processing that compensates in advance for characteristics that will be lost as a result of sound being blocked by the earphone 10a when the earphone 10a is worn by the user.

The interface 102 receives signals from the external terminal 200 wirelessly. Signals received by the interface 102 are those derived from a sound played by the external terminal 200. In other words, a signal received by the interface 102 is a playback sound signal derived from a sound (playback sound) to which the user is to listen. The playback sound signals received by the interface 102 are provided to a second input terminal of the adder 130. The playback sound signals are signals derived from music played by the external terminal 200, for example. The interface 102 may receive the playback sound signals by wired communication, instead of by wireless communication.

The adder 130 adds together a signal provided to the first input terminal and a signal provided to the second input terminal, and provides a resultant signal to the DAC 132. The DAC 132 converts the signal output from the adder 130 into an analog signal, and the amplifier 134 amplifies the signal converted by the DAC 132. The loudspeaker 140 converts the signal amplified by the amplifier 134 into a sound, which is vibrations of the air, and outputs the sound. In FIG. 1, the signal processing circuitry 120 and the adder 130, for example, may be formed by a DSP (digital signal processor) built of one or more chips, for space-saving purposes.

Figure 2:
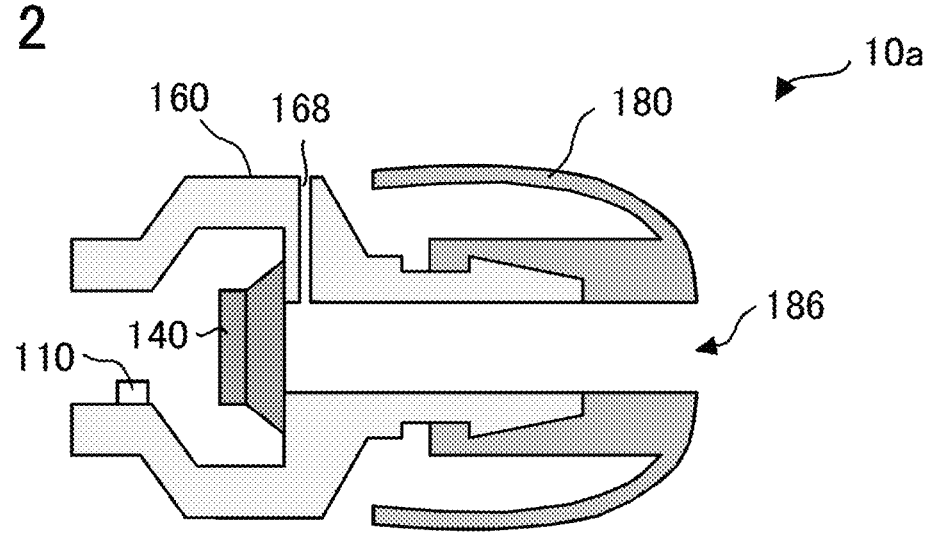
FIG. 2 shows a structure of the earphone.

FIG. 2 shows a structure of the earphone 10a. As shown in FIG. 2, the earphone 10a is an in-ear earphone, for example, and includes a housing 160 and an earbud 180. The housing 160 is approximately cylindrical in shape. In an interior space of the housing 160, there are provided the loudspeaker 140 and the microphone 110. More specifically, the loudspeaker 140 is disposed in such a manner that the loudspeaker 140 divides the interior space of the housing 160 and that the sound output of the loudspeaker 140 is directed to the external ear canal of the user. Within a space that is inside the housing 160 and is compartmentalized by the loudspeaker 140, there are provided in a space that is closer to the external ear canal than the loudspeaker 140 is (the space located to the right of the loudspeaker 140 in FIG. 2), one or more vents (ports) 168 that allow ventilation with outside air. Within the space inside the housing 160, with the space being compartmentalized by the loudspeaker 140, the microphone 110 is disposed in a space that is further from the external ear canal than the loudspeaker 140 is (the space located to the left of the loudspeaker 140 in FIG. 2).

The earbud 180 is formed of elastic materials, such as polyvinyl or sponge, and is formed into a bullet shape with a hollow cavity that opens at an opening 186. The earbud 180 is detachably attached to the housing 160 at a side of the external ear canal. When the earbud 180 is attached to the housing 160, the opening 186 communicates with the interior space of the housing 160.

From among the elements forming the earphone 10a shown in FIG. 1, elements other than the microphone 110 and the loudspeaker 140 are disposed in the interior space of the housing 160 (e.g., in the immediate vicinity of the microphone 110). Illustrations of these elements are omitted in FIG. 2.

Figure 3:
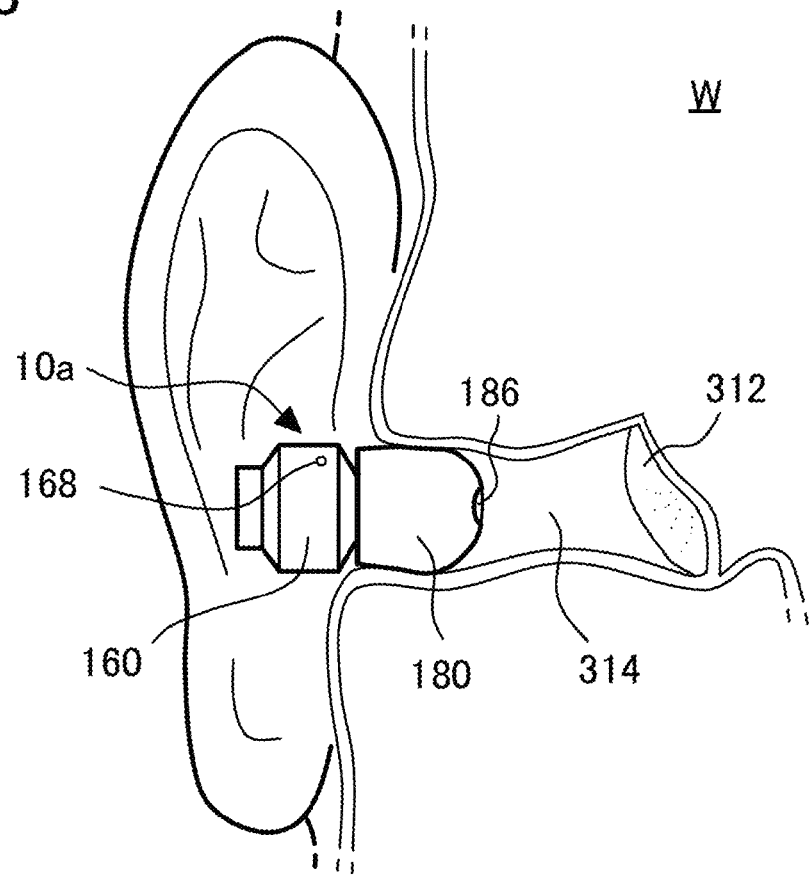
FIG. 3 shows how the earphone is worn.

FIG. 3 illustrates how the earphone 10a is worn on the right ear of a user W. As illustrated in FIG. 3, the earbud 180 of the earphone 10a is inserted into the external ear canal 314. More specifically, the earbud 180 is inserted into the external ear canal 314 in a direction in which the opening 186 faces the eardrum 312, while a part of the housing 160 remains outside of the external ear canal 314. In such a state, the external ear canal 314 of the user W is communicated with the open air through one or more vents 168 provided in the housing 160.

Next, operations performed by the earphone 10a will be described. First, description will be given of a case in which the external terminal 200 is in the playback state. In this case, the signal processing circuitry 120 generates and outputs a reverse-phase signal of an ambient sound entering through the one or more vents 168, in which the reverse-phase signal is generated based on a signal representative of a sound received by the microphone 110. More specifically, the signal representative of a sound received by the microphone 110 is amplified and is converted into digital format by the ADC 114, and based on the thus-processed signal, the reverse-phase signal is generated. The loudspeaker 140 of the earphone 10a worn by the user W outputs a sound corresponding to an added signal obtained by adding together a playback sound signal and a reverse-phase signal generated by the signal processing circuitry 120. In the external ear canal 314 of the user W, the ambient sound that has entered through the one or more vents 168 is cancelled by the reverse-phase signal included in the added signal. In this way, in a case in which the external terminal 200 is in the playback state, the user W who is wearing the earphone 10a is able to listen to a sound in which playback sound is emitted and ambient sounds are cancelled.

An ambient sound that enters through the one or more vents 168 into the external ear canal 314 and reaches the eardrum 312 when the user W is wearing the earphone 10a has frequency characteristics that are not exactly the same as frequency characteristics of the ambient sound that reaches the eardrum 312 when the user W is not wearing the earphone 10a. The ambient sound reaching the eardrum 312 when the user W is wearing the earphone 10a is attenuated at high frequencies. Furthermore, when the user W is wearing the earphone 10a, the frequency characteristics of the ambient sound in a space between the loudspeaker 140 and the eardrum 312 differ from those when the user W is not wearing the earphone 10*a*, due to factors such as sound-blocking effects caused by the earbud 180. In view of the circumstances described above, the signal processing circuitry 120 may generate the reverse-phase signal after imparting to a signal derived from a sound received by the microphone 110 characteristics such that the above-described frequency characteristics observed when the earphone 10*a* is worn are simulated.

In a case in which the external terminal 200 is in the stopped state, the signal processing circuitry 120 performs correction processing on a signal derived from a sound received by the microphone 110 and outputs the processed signal. When the external terminal 200 is in the stopped state, no playback sound signals will be provided. Accordingly, the loudspeaker 140 of the earphone 10*a* only outputs sound corresponding to the signal on which correction processing has been performed by the signal processing circuitry 120.

An ambient sound will enter through the one or more vents 168 into the external ear canal 314 of the user W who is wearing the earphone 10*a*. As described above, when the user W is wearing the earphone 10*a*, an ambient sound that enters the external ear canal 314 and reaches the eardrum 312 is attenuated at high frequencies. In the present embodiment, in a case in which the external terminal 200 is in the stopped state, the signal processing circuitry 120 performs the correction processing on a signal derived from a sound received by the microphone 110, such that when a sound corresponding to the processed signal is output from the loudspeaker 140 and is added to a sound entering through the one or more vents 168 into the external ear canal 314, a resultant mixed sound will have flat (or nearly flat) characteristics. In this way, when the user W is wearing the earphone 10*a* and when the external terminal 200 is in the stopped state, an ambient sound perceived by the user W will have nearly flat characteristics, when the ambient sound results from addition of a sound entering through the one or more vents 168 and a sound output from the loudspeaker 140. Accordingly, the user W will be able to perceive an ambient sound that is similar to the ambient sound that the user W would hear when not wearing the earphone 10*a*.

Second Embodiment

Figure 4:
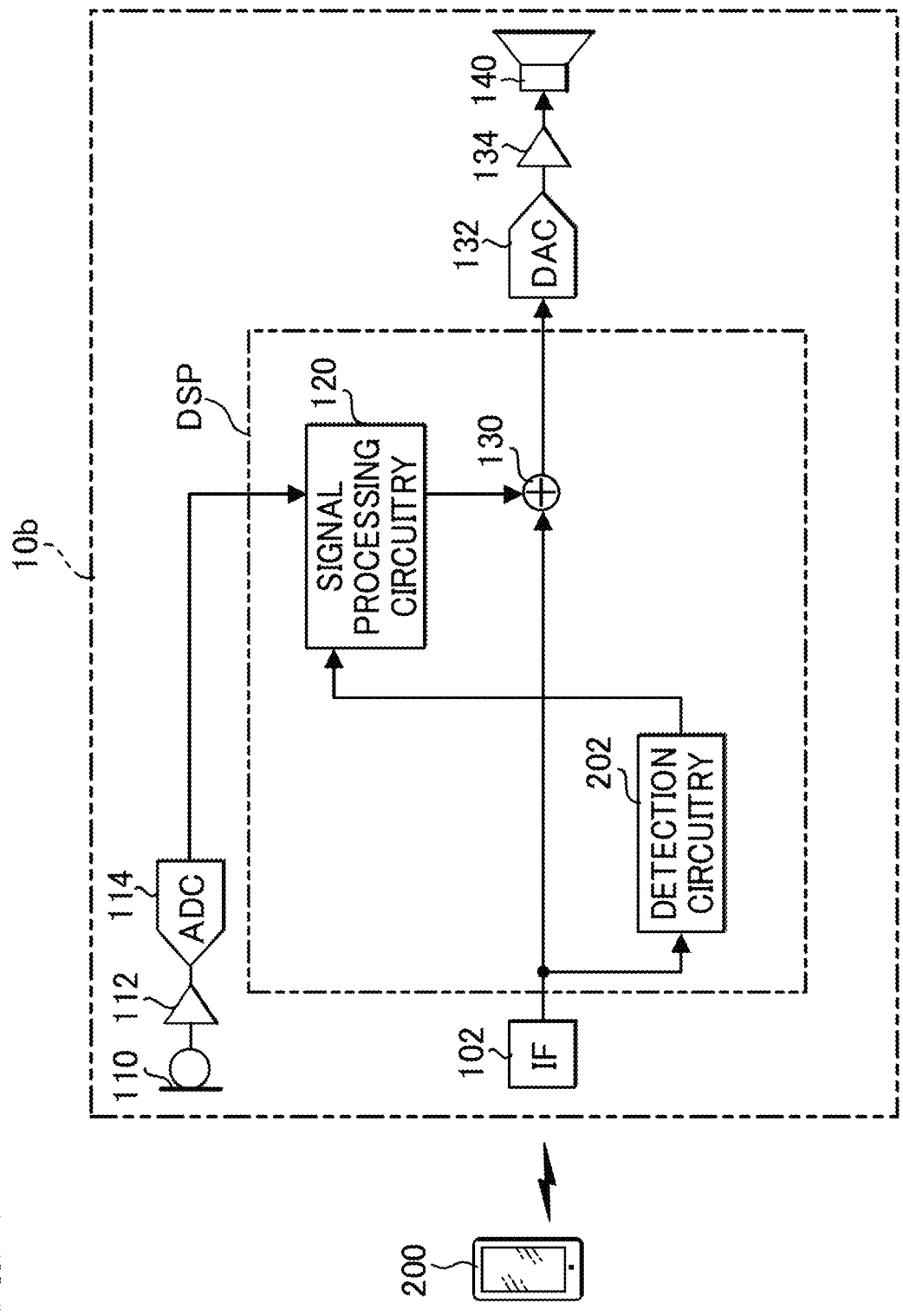
FIG. 4 is a block diagram showing a configuration of an earphone according to a second embodiment.

Next, a second embodiment will be described. FIG. 4 is a block diagram illustrating a configuration of an earphone 10*b*, which is an example of a sound output device according to the second embodiment. As shown in FIG. 4, the earphone 10*b* houses the detection circuitry 202 that detects the state of the external terminal 200. In the second embodiment, the detection circuitry 202 determines that the external terminal 200 is in the stopped state when the volume (or time-averaged value of volume) of a playback sound signal received by the interface 102 is lower than a threshold. The detection circuitry 202 determines that the external terminal 200 is in the playback state when the volume (or time-averaged value of volume) of a playback sound signal received by the interface 102 is equal to or higher than the threshold. The detection circuitry 202 then provides the result of the determination to the signal processing circuitry 120.

In FIG. 4, together with the signal processing circuitry 120 and the adder 130, for example, the detection circuitry 202 may be formed by a DSP built of one or more chips.

When a user is wearing the earphone 10*b* according to the second embodiment, in a case in which it is determined that the external terminal 200 is in the playback state, the user W is able to easily perceive a sound corresponding to a playback sound signal. In a case in which it is determined that the external terminal 200 is in the stopped state, the user W is able to perceive natural ambient sounds as if the user were not wearing the earphone 10*b*.

In the second embodiment, the detection circuitry 202 may employ hysteresis in determining whether the external terminal 200 is in a stopped state or in a playback state by setting the volume threshold used for determining that the external terminal 200 is in a stopped state or in a playback state, to have a smaller value than the volume threshold used for determining that the external terminal 200 is in the playback state.

Third Embodiment

In the first and second embodiments described above, when the state of the external terminal 200 changes from the stopped state to the playback state, and conversely changes from the playback state to the stopped state, a set of operations performed by the signal processing circuitry 120 changes from one to another that is completely different. For this reason, when the state of the external terminal 200 changes, abnormal sounds may be generated due to the change in the set of operations performed by the signal processing circuitry 120, and the user W may notice such sounds. In a third embodiment, generation of abnormal sounds accompanying the change in the set of operations is suppressed.

Figure 5:
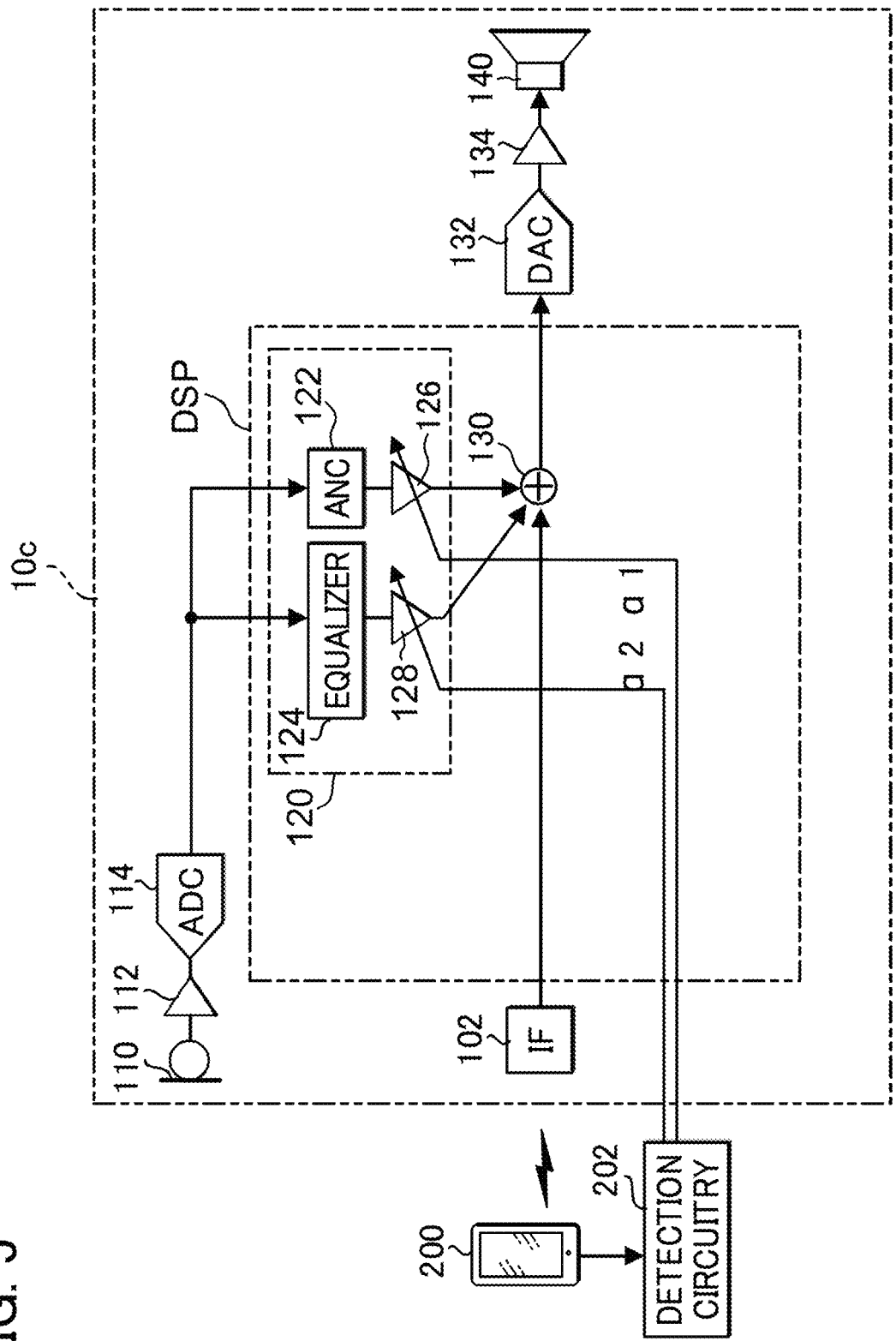
FIG. 5 is a block diagram showing a configuration of an earphone according to a third embodiment.

FIG. 5 is a block diagram illustrating a configuration of an earphone 10*c*, which is an example of a sound output device according to the third embodiment. Unlike the earphone 10*a* illustrated in FIG. 1, the signal processing circuitry 120 in the earphone 10*c* includes an ANC (active noise controller) 122, an equalizer 124, and multipliers 126 and 128.

From among the operations performed by the signal processing circuitry 120 in the first or second embodiment, the ANC 122 performs operations performed in a case in which the detection circuitry 202 detects that the external terminal 200 is in the playback state. More specifically, the ANC 122 generates reverse-phase signals of ambient sounds entering through the one or more vents 168 based on signals output from the ADC 114. From among the operations performed by the signal processing circuitry 120 in the first or second embodiment, the equalizer 124 performs operations performed in a case in which the detection circuitry 202 detects that the external terminal 200 is in the stopped state. More specifically, the equalizer 124 performs the correction processing on signals output from the ADC 114. The multiplier 128 multiples a signal output from the equalizer 124 by a coefficient $\alpha 2$, and provides a resultant multiplication signal to the adder 130.

In the third embodiment, the detection circuitry 202 detects a change in the state of the external terminal 200, from either the playback state or the stopped state to the other, based on a state signal communicated by the external terminal 200. The detection circuitry 202 then generates coefficients $\alpha 1$ and $\alpha 2$ in accordance with the result of the detection. The detection circuitry 202 provides the coefficient $\alpha 1$ to the multiplier 126, and provides the coefficient $\alpha 2$ to the multiplier 128.

Figure 6:
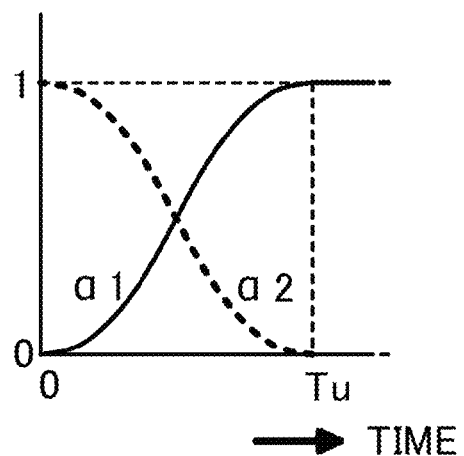
FIG. 6 shows exemplary changes made to coefficients by detection circuitry.
Figure 7:
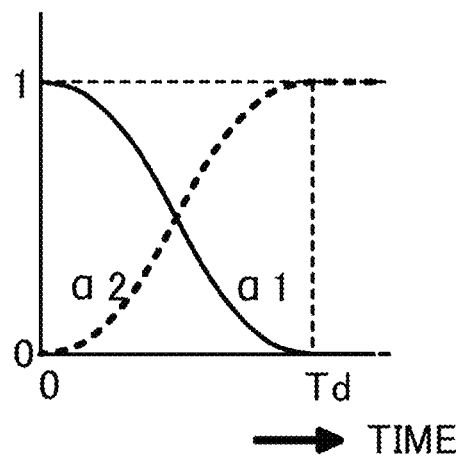
FIG. 7 shows exemplary changes made to the coefficients by the detection circuitry.

More specifically, when detecting that the state of the external terminal 200 has changed from the stopped state to the playback state, the detection circuitry 202 changes the value of the coefficient α1 from "0" to "1" smoothly over a length of time length Tu, and changes the value of the coefficient α2 from "1" to "0" smoothly over the length of time Tu, as shown in FIG. 6 for example. Accordingly, when the length of time Tu has passed since the state of the external terminal 200 changed from the stopped state to the playback state, the value of the coefficient α1 will be "1" and the value of the coefficient α2 will be "0". Here, changing "smoothly" means the slope of change is continuous. When detecting that the state of the external terminal 200 has changed from the playback state to the stopped state, the detection circuitry 202 changes the value of the coefficient α1 from "1" to "0" smoothly over a length of time Td, and changes the value of the coefficient α2 from "0" to "1" smoothly over the length of time Td, as shown in FIG. 7 for example. Accordingly, when the length of time Td has passed since the state of the external terminal 200 changed from the playback state to the stopped state, the value of the coefficient α1 will be "0" and the value of the coefficient α2 will be "1". When the lengths of time Tu and Td are not sufficiently long, abnormal sounds may be generated and the user W may notice the sounds. Thus, each of the lengths of time Tu and Td is preferably set to be one millisecond or longer.

In the third embodiment, the adder 130 adds together a multiplication signal provided by the multiplier 126, a multiplication signal provided by the multiplier 128, and a playback sound signal provided via the interface 102, and provides a resultant signal to the DAC 132. In FIG. 5, the ANC 122, the equalizer 124, the multipliers 126 and 128, and the adder 130 may be collectively formed by a DSP built of one or more chips.

In the earphone 10c, when the length of time Tu has passed since the state of the external terminal 200 changed from the stopped state to the playback state, the value of the coefficient α1 will be "1" and the value of the coefficient α2 will be "0". Accordingly, the earphone 10c will operate in a manner similar to the earphone 10a when the external terminal 200 is in the playback state. When the length of time Td has passed since the state of the external terminal 200 changed from the playback state to the stopped state, the value of the coefficient α1 will be "0" and the value of the coefficient α2 will be "1". Accordingly, the earphone 10c will operate in a manner similar to the earphone 10a when the external terminal 200 is in the stopped state.

Description will now be given of operations that are performed in the earphone 10c immediately after the state of the external terminal 200 changes from the stopped state to the playback state. In a case in which the state of the external terminal 200 has changed from the stopped state to the playback state, the detection circuitry 202 changes the value of the coefficient α1 from "0" to "1" smoothly, and changes the value of the coefficient α2 from "1" to "0" smoothly, as shown in FIG. 6. In this way, amplitude of a multiplication signal provided by the multiplier 126 does not increase rapidly, and amplitude of a multiplication signal provided by the multiplier 128 does not decrease rapidly. Thus, in the earphone 10c, the user W can be prevented from noticing abnormal sounds accompanying start of a noise-cancelling operation that starts when the state of the external terminal 200 changes from the stopped state to the playback state; and an abnormal sound accompanying a shift in the amplitude of a signal to zero, where the signal results from performing the correction processing on a signal derived from an ambient sound received by the microphone 110, by suppressing these abnormal sounds.

Description will next be given of operations that are performed in the earphone 10c immediately after the state of the external terminal 200 changes from the playback state to the stopped state. In a case in which the state of the external terminal 200 has changed from the playback state to the stopped state, the detection circuitry 202 changes the value of the coefficient α1 from "1" to "0" smoothly, and changes the value of the coefficient α2 from "0" to "1" smoothly, as shown in FIG. 7. In this way, amplitude of a multiplication signal provided by the multiplier 126 does not decrease rapidly, and amplitude of a multiplication signal provided by the multiplier 128 does not increase rapidly. Thus, with use of the earphone 10c, the user W can be prevented from noticing abnormal sounds accompanying termination of a noise-cancelling operation when the state of the external terminal 200 has changed from the playback state to the stopped state; and an abnormal sound accompanying the output of a signal resulting from performing the correction processing on a signal derived from an ambient sound received by the microphone 110, by suppressing these abnormal sounds.

Described above is a processing for preventing the user W from noticing abnormal sounds. Conversely, it may be configured such that the function of ANC 122, or that of the equalizer 124, is perceived by the user W when the state of the external terminal 200 changes. More specifically, in a case in which the state of the external terminal 200 has changed from the stopped state to the playback state, the detection circuitry 202 may output the coefficients α1 and α2 such that a period A and a period B are alternately repeated multiple times, after which the coefficients α1 and α2 are fixed to "1" and "0", respectively. In the period A, the coefficient α1 is "1" and the coefficient α2 is "0"; in the period B, the coefficient α1 is "0" and the coefficient α2 is "1". A state in which the coefficient α1 is "1" and the coefficient α2 is "0" is a state in which noise is cancelled. In this state, the amplitude of an ambient sound signal derived from a sound received by the microphone 110 is brought to zero. Conversely, a state in which the coefficient α1 is "0" and the coefficient α2 is "1" is a state in which the noise is not cancelled. In this state, a signal obtained by correcting an ambient sound signal derived from a sound received by the microphone 110 is output. Accordingly, in a case in which the state of the external terminal 200 has changed from the stopped state to the playback state, the user W would hear noise-cancelled sound and non-noise-cancelled sound that are alternatingly repeated, and thus, the user W is able to perceive how noise cancelling is effective while the playback sound signal is being played.

Figure 14:
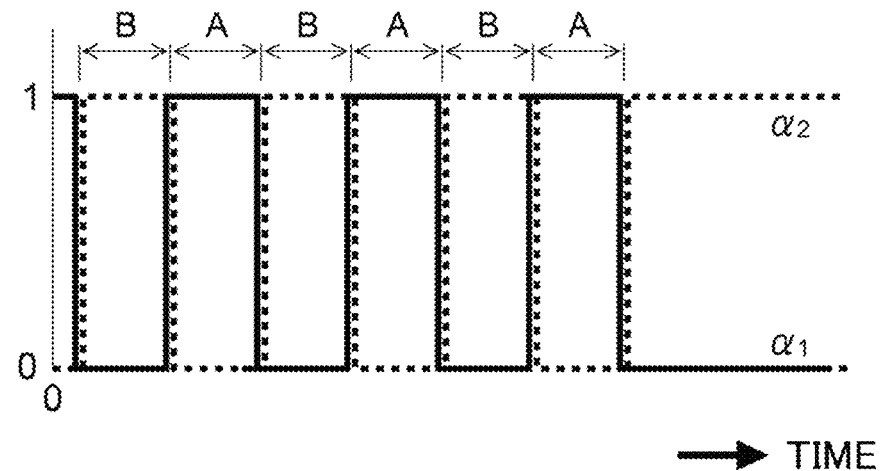
FIG. 14 shows exemplary changes made to coefficients by the detection circuitry.

In a case in which the state of the external terminal 200 has changed from the playback state to the stopped state, the detection circuitry 202 may output the coefficients α1 and α2 such that the period A and the period B are alternately repeated multiple times, after which the coefficients α1 and α2 are fixed to "0" and "1", respectively, as shown in FIG. 14. According to this configuration, in a case in which the state of the external terminal 200 has changed from the playback state to the stopped state, the user W would listen to a corrected ambient sound obtained by correcting the ambient sound signal derived from a sound received by the microphone 110 and the ambient sound entering through the one or more vents 168 in a state in which the amplitude of the ambient sound signal received by the microphone 110 is set to zero. Accordingly, the user W is able to perceive to what extent the correction processing is effective while the playback sound signal is not being played.

Figure 13:
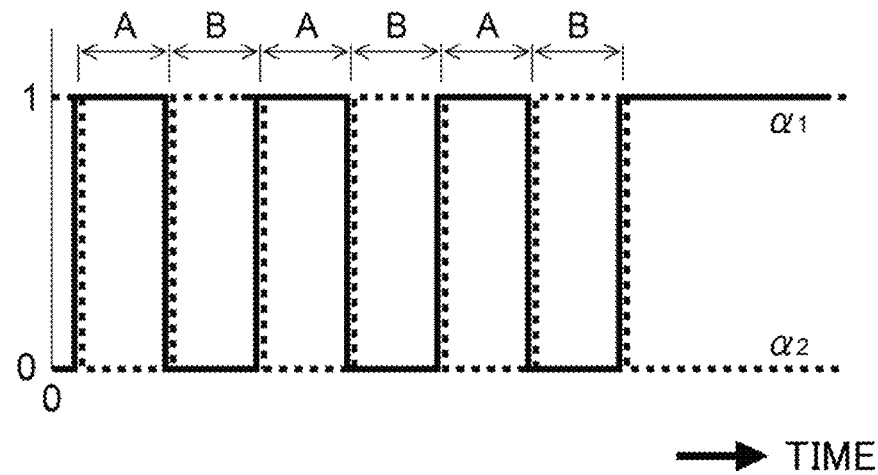
FIG. 13 shows exemplary changes made to coefficients by the detection circuitry.

Given that the period A and the period B together form one cycle, the cycle is preferably within a range of one to two seconds, for example, in view of having the user W perceive the function of the ANC 122 or that of the equalizer 124. From the same viewpoint, the number of times the period A and the period B are repeated is preferably two to four times, for example. Furthermore, it may be configured such that the user W is able to select in which of the manners shown in FIG. 6 or FIG. 7 the coefficients α1 and α2 are to be output in a case in which the state of the external terminal 200 changes, by way of a switch additionally provided at the earphone 10c or through an input instruction at the external terminal 200. Likewise, it may be configured such that the user W is able to select in which of the manners shown in FIG. 13 or FIG. 14 the coefficients α1 and α2 are to be output in a case in which the state of the external terminal 200 changes.

Fourth Embodiment

Figure 8:
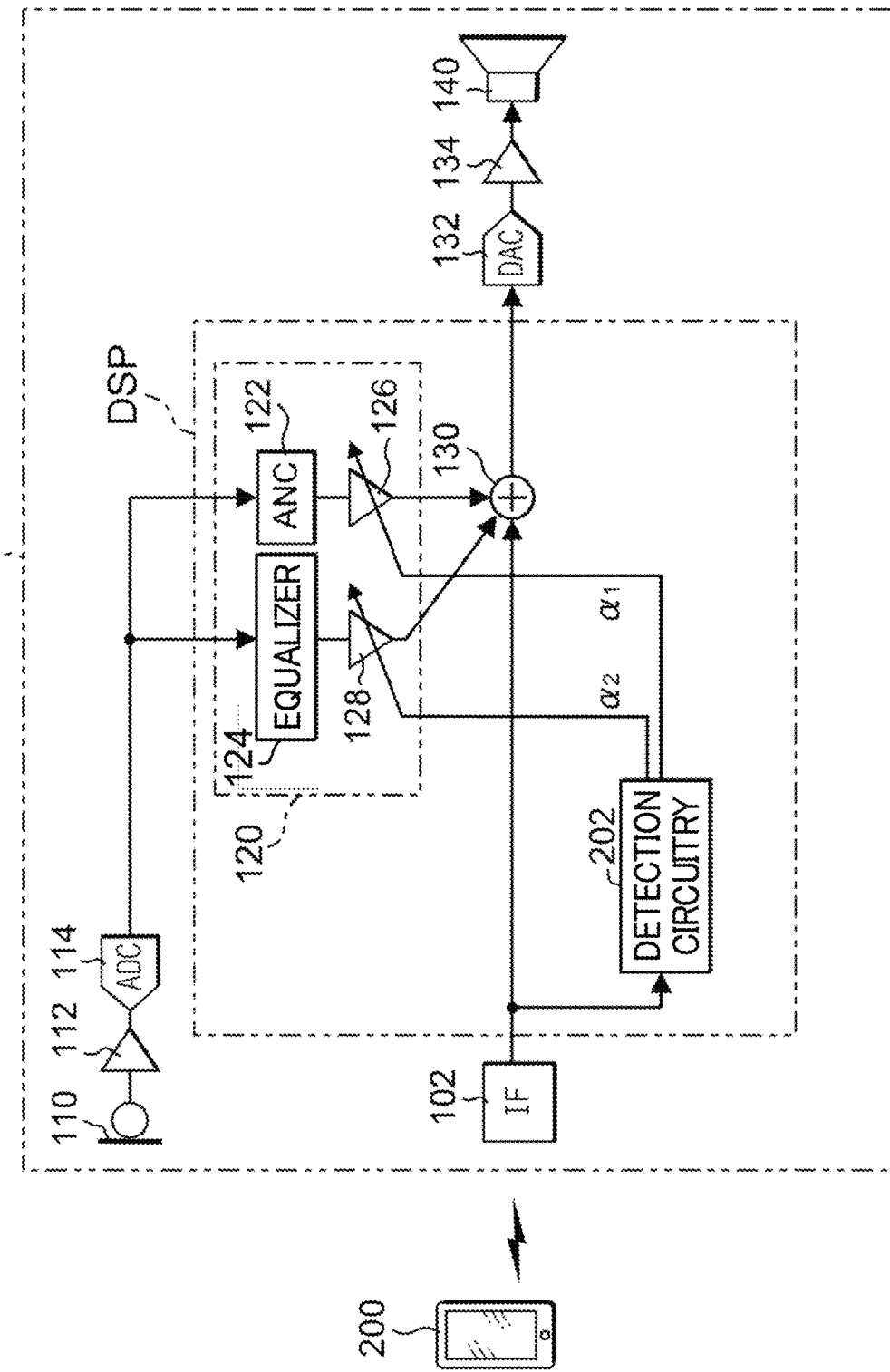
FIG. 8 is a block diagram showing a configuration of an earphone according to a fourth embodiment.

FIG. 8 is a block diagram showing a configuration of an earphone 10d, which is an example of a sound output device according to a fourth embodiment. As shown in FIG. 8, similarly to the earphone 10b, the earphone 10d houses the detection circuitry 202, which detects the state of the external terminal 200. Similarly to the second embodiment, the detection circuitry 202 according to the fourth embodiment determines that the external terminal 200 is in the stopped state when the volume (or time-averaged value of volume) of a playback sound signal received by the interface 102 is lower than a threshold. The detection circuitry 202 determines that the external terminal 200 is in the playback state when the volume (or time-averaged value of volume) of a playback sound signal received by the interface 102 is equal to or higher than the threshold. The detection circuitry 202 in the fourth embodiment generates the coefficients α1 and α2 depending on a change in the state obtained as a result of the determination.

In FIG. 8, together with the ANC 122, the equalizer 124, the multipliers 126 and 128, and the adder 130, the detection circuitry 202 may be formed by a DSP built by one or more chips.

With the earphone 10d, similarly to the case of the earphone 10c, the user W can be prevented from noticing abnormal sounds when the state of the external terminal 200 changes from either of the stopped state or the playback state to the other by outputting the coefficients α1 and α2 in the manners shown in FIG. 6 and FIG. 7. By outputting the coefficients α1 and α2 in the manners shown in FIG. 13 and FIG. 14, it is possible to have the user W perceive the function of the ANC 122 or the function of the equalizer 124.

Fifth Embodiment

In the first to the fourth embodiments, a feed-forward technique is used in which reverse-phase signals for noise cancelling are generated based on signals derived from sounds received by the microphone 110. In this embodiment, a feedback technique may be used along with the feed-forward technique.

Figure 9:
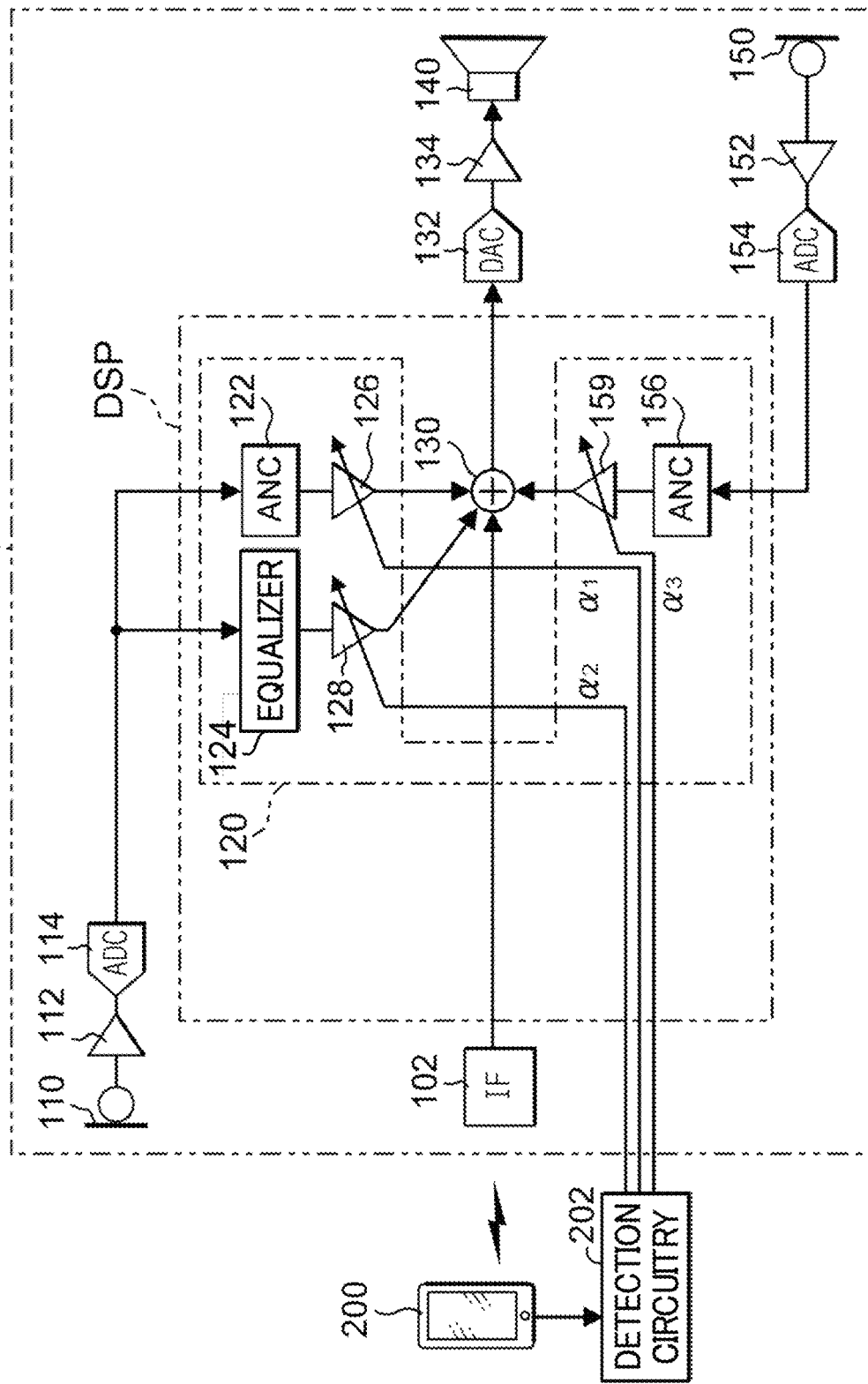
FIG. 9 is a block diagram showing a configuration of an earphone according to a fifth embodiment.

FIG. 9 is a block diagram showing a configuration of an earphone 10e, which is an example of a sound output device according to a fifth embodiment. As shown in FIG. 9, the earphone 10e further includes a microphone (second microphone) 150, an amplifier 152, and an ADC 154; and the signal processing circuitry 120 further includes an ANC 156 and a multiplier 159, as compared to the signal processing circuitry 120 in the third embodiment (FIG. 5).

Figure 10:
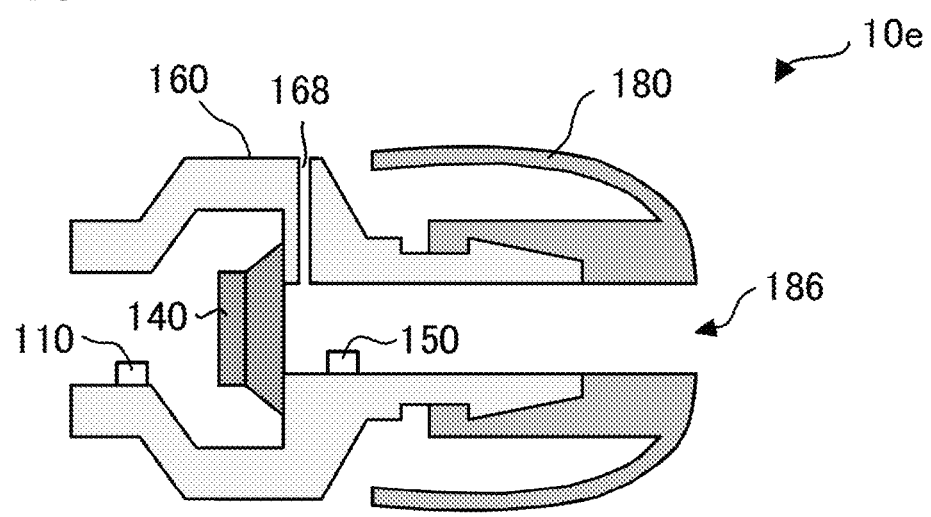
FIG. 10 shows a structure of the earphone.

As shown in FIG. 10, the microphone 150 is mounted near the loudspeaker 140. For example, within a space that is inside the housing 160 and is compartmentalized by the loudspeaker 140, the microphone 150 is mounted in a space that is closer to the external ear canal than the loudspeaker 140 is (the space located to the right of the speaker 140 in FIG. 10). The microphone 150 receives sounds from near the loudspeaker 140, i.e., a sound output from the loudspeaker 140, and/or other sounds. The amplifier 152 amplifies a signal (second signal) derived from a sound received by the microphone 150, and the ADC 154 converts the signal amplified by the amplifier 152 into a digital signal and provides the converted signal to the ANC 156.

The ANC 156 generates a reverse-phase signal (feedback reverse-phase signal) by adjusting the frequency, amplitude, and phase of the signal output from the ADC 154. The reverse-phase signal corresponds to a signal obtained by inverting the phase of the signal output from the ADC 154. The volume (amplitudes) of the reverse-phase signals is substantially equal to that of the signals output from the ADC 154. The multiplier 159 multiples a reverse-phase signal output from the ANC 156 by a coefficient α3, and provides a resultant multiplication signal to the adder 130.

In the fifth embodiment, the detection circuitry 202 detects a change in the state of the external terminal 200, from either of the playback state or the stopped state to the other, based on a state signal communicated by the external terminal 200. The detection circuitry 202 then generates the coefficient α3, in addition to the coefficients α1 and α2, depending on the result of the detection. The value of the coefficient α3 smoothly changes from "0" to "1" when it is detected that the state of the external terminal 200 has changed from the stopped state to the playback state; and the value of the coefficient α3 smoothly changes from "1" to "0" when it is detected that the state of the external terminal 200 has changed from the playback state to the stopped state. The coefficient α1 may be used as the coefficient α3.

In the fifth embodiment, the adder 130 adds together a multiplication signal provided by the multiplier 126, a multiplication signal provided by the multiplier 128, a playback sound signal provided via the interface 102, and a multiplication signal provided by the multiplier 159, and provides a resultant signal to the DAC 132.

Next, operations of the earphone 10e will be described. When a length of time Tu has passed since the state of the external terminal 200 changed from the stopped state to the playback state, the values of the coefficients α1 and α3 will each be "1" and the value of the coefficient α2 is "0". Accordingly, the loudspeaker 140 outputs a sound corresponding to an added signal resulting from adding together a reverse-phase signal output from the ANC 122, a playback sound signal provided by the external terminal 200, and a reverse-phase signal output from the ANC 156.

Noise cancelling performed by the ANC 122 is based on a feed-forward technique. In other words, only the ambient sound received by the microphone 110 is considered, and sound is not considered that would reach the eardrum 312 of the user W who is wearing the earphone 10e and that would be perceived by the user W. Thus, there may be a case in which the use of only the reverse-phase signals provided by the ANC 122 is not sufficient to effectively suppress ambient sounds. In view of the above circumstances, there is used in the present embodiment a technique in which the feedback technique is used along with the feed-forward technique. More specifically, noise is cancelled by receiving at the microphone 150 a sound that reaches the eardrum 312 of the user W who is wearing the earphone 10e and is perceived by the user W and by adding to a reverse-phase signal provided by the ANC 122 a reverse-phase signal generated by inverting by the ANC 156 the phase of a signal derived from the sound received by the microphone 150. In this way, in the present embodiment, when the external terminal 200 is in the playback state, the user W who is wearing the earphone 10e is able to listen to a playback sound while ambient sounds are effectively suppressed.

When the length of time Td has passed since the state of the external terminal 200 changed from the playback state to the stopped state, the values of the coefficients α1 and α3 will each be "0" and the value of the coefficient α2 will be "1". Accordingly, since a reverse-phase signal generated by the ANC 122 and a reverse-phase signal generated by the ANC 156 are not provided to the adder 130, the earphone 10e will operate in a manner substantially similar to the earphone 10c when the external terminal 200 is in the stopped state.

In this way, in the present embodiment, when the external terminal 200 is in the stopped state, the user W who is wearing the earphone 10e is able to perceive natural ambient sounds resulting from the correction processing performed by the equalizer 124. With the use of the earphone 10e, as in the case with the earphone 10c, the user W can be prevented from noticing abnormal sounds when the state of the external terminal 200 has changed from either of the stopped state or the playback state to the other by outputting the coefficients α1 (≈α3) and α2 in the manners shown in FIG. 6 and FIG. 7. If the coefficients α1 (≈α3) is output in the manners shown in FIG. 13 and FIG. 14, it is possible to have the user W perceive the function of the ANC 122 (156) or the function of the equalizer 124.

Sixth Embodiment

Figure 11:
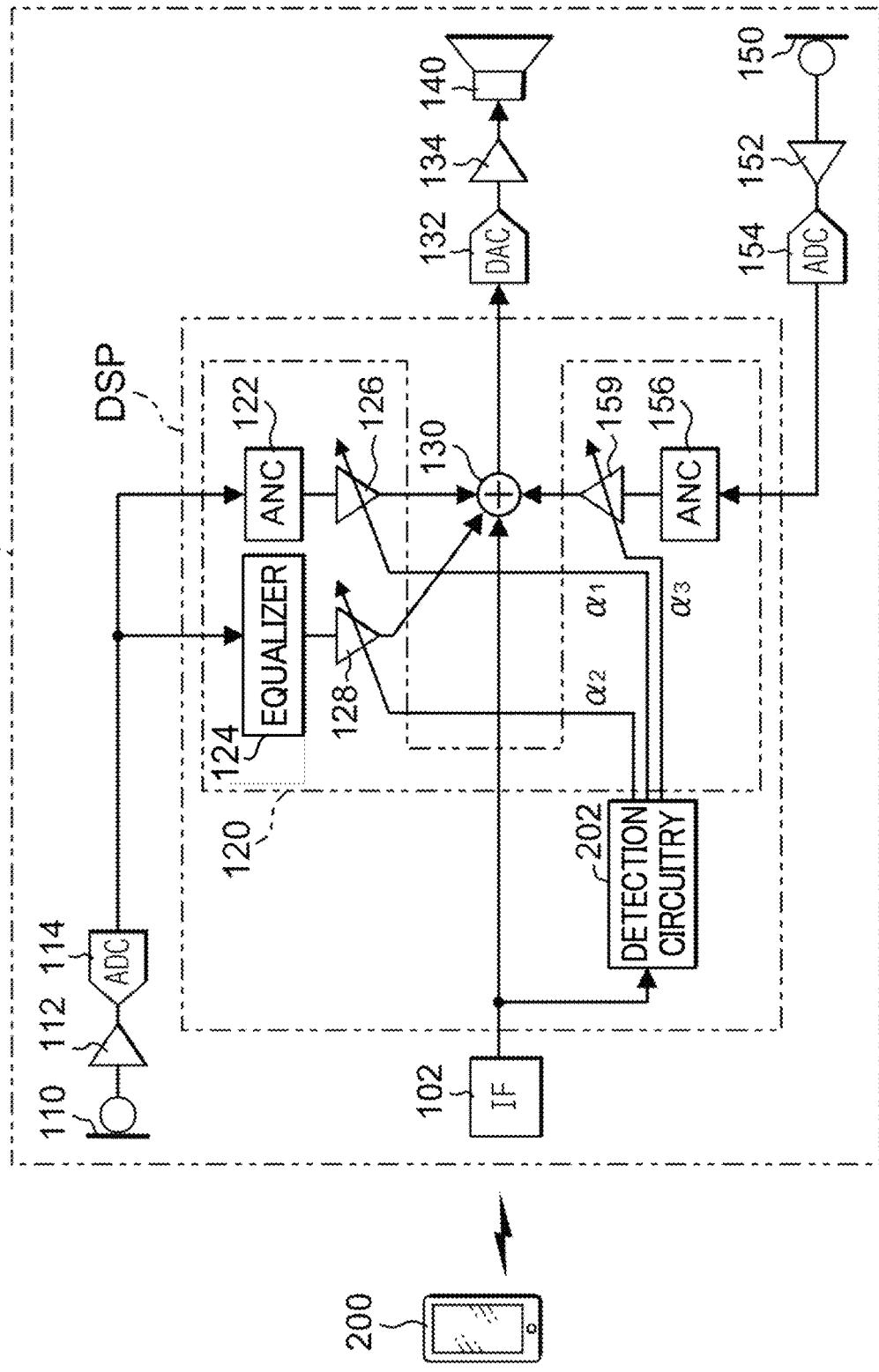
FIG. 11 is a block diagram showing a configuration of an earphone according to a sixth embodiment.

FIG. 11 is a block diagram showing a configuration of an earphone 10f, which is an example of a sound output device according to a sixth embodiment. As shown in FIG. 11, similarly to the earphone 10d, the earphone 10f houses the detection circuitry 202 that detects the state of the external terminal 200. Similarly to the fourth embodiment, the detection circuitry 202 in the sixth embodiment determines that the external terminal 200 is in the stopped state when the volume (or time-averaged value of volume) of a playback sound signal received by the interface 102 is lower than a threshold. The detection circuitry 202 determines that the external terminal 200 is in the playback state when the volume (or time-averaged value of volume) of a playback sound signal received by the interface 102 is equal to or higher than the threshold. The detection circuitry 202 in the sixth embodiment generates the coefficients α1, α2, and α3 depending on a change in the state obtained as a result of the determination.

In FIG. 11, together with the ANCs 122 and 156, the equalizer 124, the multipliers 126, 128, and 159, and the adder 130, the detection circuitry 202 may be formed by a DSP built of one or more chips.

With use of the earphone 10f, as in the case of the earphone 10e, when the external terminal 200 is in the playback state, the user W is able to listen to playback sounds while ambient sounds are effectively suppressed; and when the external terminal 200 is in the stopped state, the user W is able to hear natural ambient sounds. Furthermore, with use of the earphone 10f, the user W can be prevented from noticing abnormal sounds when the state of the external terminal 200 has changed from either of the stopped state or the playback state to the other.

Seventh Embodiment

In the first to the sixth embodiments described above, an earphone is described as an example of the sound output device. Alternatively, the sound output device may be headphones.

Figure 12:
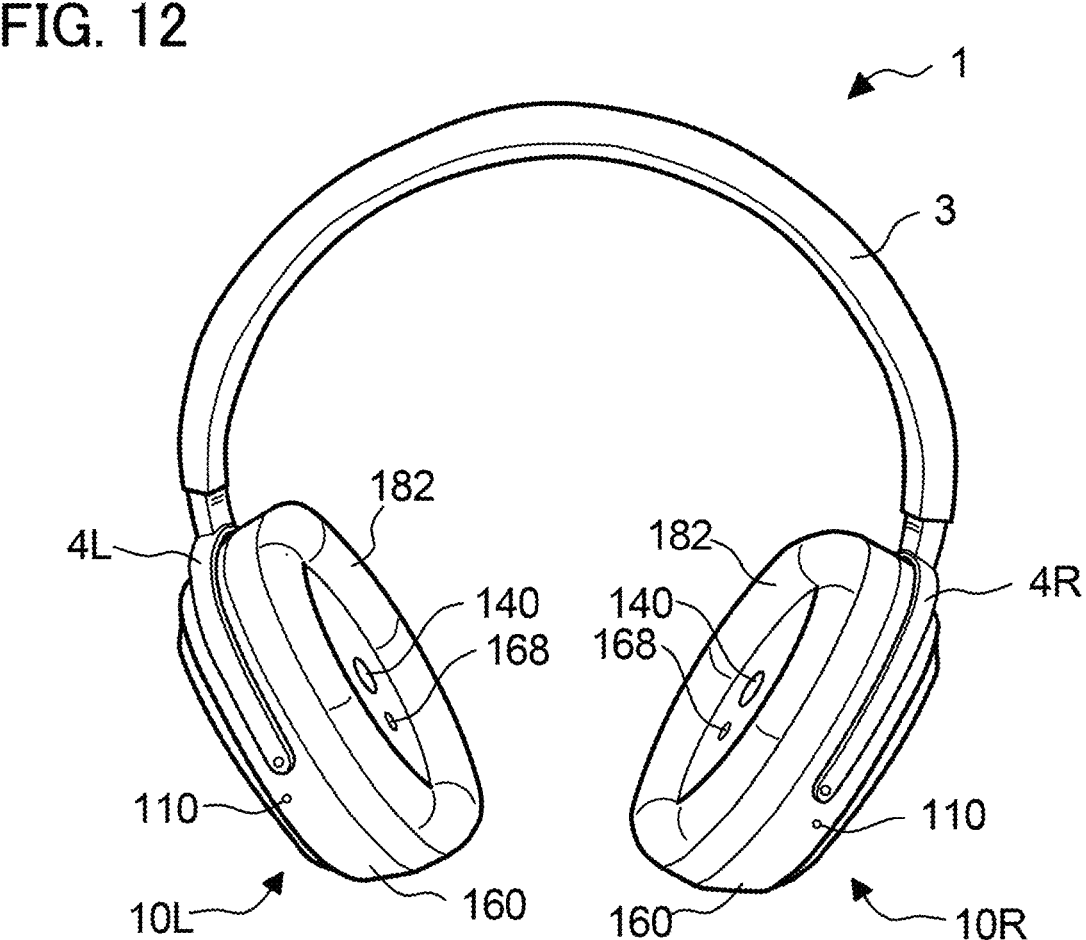
FIG. 12 shows an external view illustrating headphones according to a seventh embodiment.

FIG. 12 shows an external view illustrating headphones 1, which are an example of a sound output device according to a seventh embodiment. As shown in FIG. 11, the headphones 1 include headphone units 10L and 10R; a headband 3; and arms 4L and 4R. The headband 3 is made of an elastic metal or elastic resin and is formed into an arc shape in a longitudinal direction. Of the two ends of the headband 3, one end (located on the left in FIG. 12) is mounted to, via the arm 4L, the headphone unit 10L used for the left ear; and the other end (located on the right in FIG. 12) is mounted to, via the arm 4R, the headphone unit 10R used for the right ear.

The headphone unit 10L includes a substantially cylindrical housing 160 and an ear pad 182 mounted to the housing 160. An electrical configuration of the headphone unit 10L is similar to that of any of the earphones 10a to 10E The headphone unit 10L includes a microphone 110 and a loudspeaker 140. In a case in which the electrical configuration of the headphone unit 10L is the same as that of the earphone 10e or 10f, the headphone unit 10L further includes a microphone 150 (illustration omitted in FIG. 12). In the housing 160, there is provided a vent 168 that allows ventilation with ambient air, where the vent 168 allows the ventilation also when the user W is wearing the headphone unit 10L. The headphone unit 10R is configured substantially the same as the headphone unit 10L. Left-channel stereo signals are provided to the headphone unit 10L by the external terminal 200 and right-channel stereo signals to the headphone unit 10R.

When wearing the headphones 1, the user W holds the headphone units 10L and 10R while extending the ends of the arc-shaped headband 3 outward, and puts the ear pad 182 of the headphone unit 10L over the left ear and puts the ear pad 182 of the headphone unit 10R over the right ear. Because of the elasticity of the headband 3, restoring force is generated that causes the ends of the headband 3 to come close to each other. Accordingly, the headphone units 10L and 10R attached to the ends of the headband 3 give lateral pressure to the head of the user W when the headphones 1 are worn by the user. By this lateral pressure, the headphones 1 are held at a particular position.

When the user W is wearing the headphones 1, the ears are covered by the ear pads 182. Accordingly, conditions for sound transmission will be similar to those when the earphone 10 (e.g., earphone 10a) according to any of the above embodiments, is worn by the user W. Accordingly, with use of the headphones 1, when the external terminal 200 is in the playback state, the user W who is wearing the headphones 1 is able to listen to playback sounds of stereo signals while ambient sounds are effectively suppressed; and when the external terminal 200 is in the stopped state, the user W is able to hear natural ambient sounds.

Applications and Modifications

In the above embodiments, the coefficients α1 (α3) and α2 change smoothly as shown in FIG. 6 or FIG. 7 in order to prevent the user W from noticing abnormal sounds.

Figure 15:
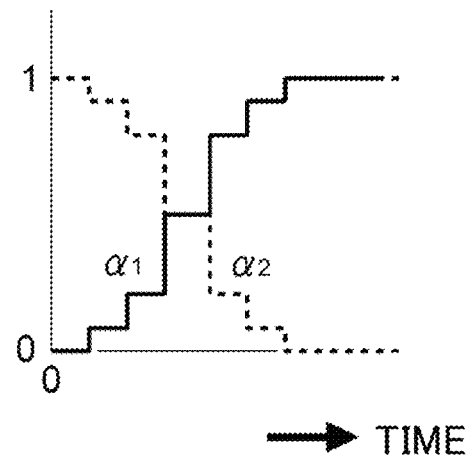
FIG. 15 shows exemplary changes made to coefficients by the detection circuitry.
Figure 16:
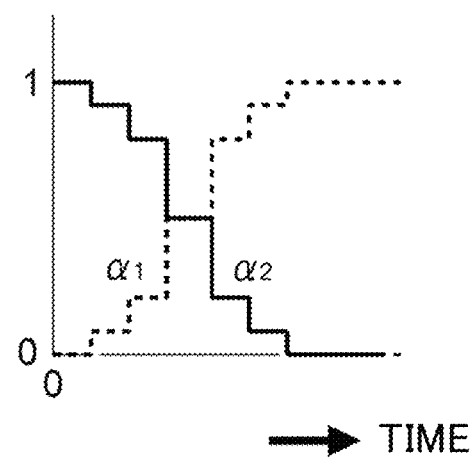
FIG. 16 shows exemplary changes made to coefficients by the detection circuitry.

Alternatively, these coefficients may be caused to change in a stepwise manner and be output as shown in FIG. 15 or FIG. 16, as long as abnormal sounds are not noticeable to the user W. The "stepwise manner" means the slope of change is discontinuous. The coefficients α1 (α3) and α2 are output in the manners shown in FIG. 13 or FIG. 14 by switching between the period A and the period B, in order to have the user W perceive the function of the ANC 122 or the function of the equalizer 124. The coefficients α1 (α3) and α2 may be changed and output smoothly or in the stepwise manner as long as the functions are perceivable by the user W.

Aspects

From the embodiments described above, the following exemplary aspects are derivable.

Aspect 1

A sound output device according to a preferred aspect 1 includes: a first microphone configured to receive ambient sounds from around a user; a loudspeaker configured to output sounds toward an eardrum of the user; signal processing circuitry configured, in a case in which it is detected that an external terminal is in a playback state in which the external terminal provides a playback sound signal indicative of a playback sound, to generate a first reverse-phase signal based on a first signal derived from a sound received by the first microphone, and configured to impart predetermined frequency characteristics to the first signal in a case in which it is detected that the external terminal is in a stopped state that is not the playback state; and an adder configured to add together the playback sound signal and a signal output from the signal processing circuitry, to output a resultant signal for output by the loudspeaker. By the sound output device according to aspect 1, when the external terminal is in the playback state, the user is less likely to experience difficulty in perceiving the playback sound; and when the external terminal is in the stopped state, the user is able to hear natural ambient sounds.

Aspect 2

A sound output device according to aspect 2 is the sound output device according to aspect 1, in which the signal processing circuitry includes: a first multiplier configured to multiply the first reverse-phase signal by a predetermined first coefficient; and a second multiplier configured to multiply a signal obtained by imparting the predetermined frequency characteristics to the first signal, by a second coefficient that is different from the first coefficient, and the first coefficient and the second coefficient depend on a change in a state of the external terminal either from the playback state to the stopped state, or from the stopped state to the playback state. According to the sound output device according to aspect 2, the extent of noise cancelling and the amplitude of a signal obtained by imparting the predetermined characteristics to the first signal are adjusted depending on a change in a state of the external terminal Aspect 3

A sound output device according to aspect 3 is the sound output device according to aspect 2, in which the sound output device further includes detection circuitry configured to output the first coefficient and the second coefficient depending on the change in the state. By the sound output device according to aspect 3, the first coefficient and the second coefficient can be output, depending on the change in the state of the external terminal Aspect 4

A sound output device according to aspect 4 is the sound output device according to aspect 3, in which the detection circuitry is configured to output the first coefficient and the second coefficient either smoothly or in a stepwise manner, when the change in the state is detected. By the sound output device according to aspect 4, the user can be prevented from noticing an abnormal sound that is generated when the state of the external terminal has changed.

Aspect 5

A sound output device according to aspect 5 is the sound output device according to aspect 3, in which the detection circuitry is configured to output the first coefficient and the second coefficient alternatingly and repeatedly. By the sound output device according to aspect 5, when the state of the external terminal has changed, it is possible to have a user perceive the extent of noise cancelling and the degree of the signal processing imparted to the first signal.

Aspect 6

A sound output device according to aspect 6 is the sound output device according to aspect 1, in which the sound output device further includes a second microphone configured to receive sounds from near the loudspeaker; the signal processing circuitry is configured to generate a second reverse-phase signal based on a second signal derived from a sound received by the second microphone; and the adder is configured to add the playback sound signal, the signal output from the signal processing circuitry, and the second reverse-phase signal. By the sound output device according to aspect 6, noise can be effectively suppressed.

Aspect 7

A method of controlling a sound output device according to aspect 7 includes a first microphone that receives ambient sounds from around a user and a loudspeaker that outputs sounds toward an eardrum of the user; generating, in a case in which it is detected that an external terminal is in a playback state that provides a playback sound signal indicative of a playback sound, a first reverse-phase signal based on a first signal derived from a sound received by the first microphone; imparting predetermined frequency characteristics to the first signal in a case in which it is detected that the external terminal is in a stopped state that is not the playback state; and outputting to the loudspeaker a signal obtained by adding together the playback sound signal and a signal obtained by imparting the predetermined frequency characteristics to the first signal. By the control method of the sound output device according to aspect 7, when the external terminal is in the playback state, the user is less likely to experience difficulty in perceiving playback sounds; and when the external terminal is in the stopped state, the user is able to hear natural ambient sounds.

DESCRIPTION OF REFERENCE SIGNS

1 . . . headphones; 10 . . . earphone; 110, 150 . . . microphone; 120 . . . signal processing circuitry; 124 . . . equalizer; 130 . . . adder; 140 . . . loudspeaker; 160 . . . housing; 168 . . . vent; 200 . . . external terminal; 202 . . . detection circuitry.

What is claimed is:

1. A sound output device comprising:
a first microphone configured to receive ambient sounds from around a user;
a loudspeaker configured to output sounds toward an eardrum of the user;
signal processing circuitry configured, in a case in which it is detected that an external terminal is in a playback state in which the external terminal provides a playback sound signal indicative of a playback sound, to generate a first reverse-phase signal based on a first signal derived from a sound received by the first microphone, and configured to impart predetermined frequency characteristics to the first signal in a case in which it is detected that the external terminal is in a stopped state that is not the playback state; and an adder configured to add together the playback sound signal and a signal output from the signal processing circuitry obtained by imparting the predetermined frequency characteristics to the first signal, to output a resultant signal for output by the loudspeaker.

2. The sound output device according to claim 1, wherein the signal processing circuitry comprises:

a first multiplier configured to multiply the first reverse-phase signal by a predetermined first coefficient; and a second multiplier configured to multiply a signal obtained by imparting the predetermined frequency characteristics to the first signal, by a second coefficient that is different from the first coefficient, and wherein the first coefficient and the second coefficient depend on a change in a state of the external terminal either from the playback state to the stopped state, or from the stopped state to the playback state.

3. The sound output device according to claim 2, further comprising detection circuitry configured to output the first coefficient and the second coefficient depending on the change in the state.

4. The sound output device according to claim 3, wherein the detection circuitry is configured to output the first coefficient and the second coefficient either smoothly or in a stepwise manner, when the change in the state is detected.

5. The sound output device according to claim 3, wherein the detection circuitry is configured to output the first coefficient and the second coefficient alternatingly and repeatedly.

6. The sound output device according to claim 1, further comprising a second microphone configured to receive sounds from near the loudspeaker, wherein the signal processing circuitry is configured to generate a second reverse-phase signal based on a second signal derived from a sound received by the second microphone, and wherein the adder is configured to add the playback sound signal, the signal output from the signal processing circuitry, and the second reverse-phase signal.

7. A method of controlling a sound output device including a first microphone that receives ambient sounds from around a user and a loudspeaker that outputs sounds toward an eardrum of the user;

the method comprising:

generating, in a case in which it is detected that an external terminal is in a playback state that provides a playback sound signal indicative of a playback sound, a first reverse-phase signal based on a first signal derived from a sound received by the first microphone;

imparting predetermined frequency characteristics to the first signal in a case in which it is detected that the external terminal is in a stopped state that is not the playback state; and outputting to the loudspeaker a signal obtained by adding together the playback sound signal and a signal obtained by imparting the predetermined frequency characteristics to the first signal.

* * * * *